US012561422B2

(12) United States Patent
Tomabechi

(10) Patent No.: US 12,561,422 B2
(45) Date of Patent: Feb. 24, 2026

(54) SYSTEM FOR AUTHENTICATING DATA

(71) Applicant: Cognitive Research Labs, Inc., Tokyo (JP)

(72) Inventor: Hideto Tomabechi, Tokyo (JP)

(73) Assignee: Cognitive Research Labs, Inc., Tokyo (JP)

( * ) Notice: Subject to any disclaimer, the term of this patent is extended or adjusted under 35 U.S.C. 154(b) by 165 days.

(21) Appl. No.: 18/410,406

(22) Filed: Jan. 11, 2024

(65) Prior Publication Data

US 2024/0354392 A1     Oct. 24, 2024

(30) Foreign Application Priority Data

Apr. 19, 2023     (JP) ................................. 2023-068581

(51) Int. Cl.
| | |
|---|---|
| *G06F 21/44* | (2013.01) |
| *G06F 21/16* | (2013.01) |
| *G06F 21/60* | (2013.01) |

(52) U.S. Cl.
CPC .............. *G06F 21/44* (2013.01); *G06F 21/16* (2013.01); *G06F 21/602* (2013.01)

(58) Field of Classification Search
CPC ......... G06F 21/44; G06F 21/16; G06F 21/602
USPC ........................................................ 726/22
See application file for complete search history.

(56) References Cited

U.S. PATENT DOCUMENTS

| | | | |
|---|---|---|---|
| 9,122,729 B2 * | 9/2015 | Love ................... | G06F 16/2477 |
| 2008/0229113 A1 | 9/2008 | Yagawa | |
| 2016/0132704 A1 * | 5/2016 | Engels ................... | H04W 4/80 |
| | | | 340/10.42 |
| 2022/0188222 A1 | 6/2022 | Hashimoto et al. | |

(Continued)

FOREIGN PATENT DOCUMENTS

| | | |
|---|---|---|
| JP | 2006-094373 A | 4/2006 |
| JP | 2008-242988 A | 10/2008 |

(Continued)

OTHER PUBLICATIONS

Extended European Search Report issued in European Patent Application No. 24154320.6, dated Jun. 26, 2024 (16 pages).

(Continued)

*Primary Examiner* — Michael S McNally
(74) *Attorney, Agent, or Firm* — Nakanishi IP Associates, LLC

(57) ABSTRACT

A system includes a first data processing unit used by a user, and a second data processing unit used by an authenticator, the first data processing unit including a converter for converting data designated by the user into a hash value, and a user-side communication apparatus making communication with the second data processing unit, the second data processing unit including an authenticator-side communication apparatus making communication with the user-side communication apparatus, a controller, and a clock for notifying a time at which the second data processing unit received the hash value, to the controller, the clock consisting of a clock having a resolution having a highest accuracy (Continued)

at that time, the controller making a time stamp token including information in which the hash value and the time at which the hash value was received are integrated, and transmitting the time stamp token to the first data processing unit.

11 Claims, 8 Drawing Sheets

(56)                    References Cited

U.S. PATENT DOCUMENTS

2022/0284447 A1 *    9/2022    Bulawski ......... G06K 19/07758
2022/0342086 A1      10/2022   Yoshida

FOREIGN PATENT DOCUMENTS

| JP | 2017-175377 | A | 9/2017 |
| JP | 2022-094755 | A | 6/2022 |
| WO | 2021/053795 | A1 | 3/2021 |

OTHER PUBLICATIONS

Antichi G et al: "Enabling Open-Source High Speed Network Monitoring on NetFPGA", 2012 IEEE Network Operations and Management Symposium (NOMS 2012) : Maui, Hawaii, USA, Apr. 16-20, 2012, IEEE, Piscataway, NJ, pp. 1029-1035, XP 32448776, DOI: 10.1109/NOMS.2012.6212025 ISBN: 978-1-4673-0267-8 p. 1031-p. 1032 (7 pages).
Krehlik P et al: "Fibre-optic delivery of time and frequency to VLBI station", arxiv.org, Cornell University Library, 201 Olin Library Cornell University Ithaca, NY 14853, Mar. 28, 2017, XP 80756005, DOI: 10.1051/0004-6361/201730615 the whole document (8 pages).
Office Action issued in Japanese Patent Application No. 2023-068581 mailed on Aug. 26, 2025, with English Translation (13 pages).

* cited by examiner

SYSTEM FOR AUTHENTICATING DATA

BACKGROUND OF THE INVENTION

Field of the Invention

The invention relates to a system for authenticating data, a data processing unit, a method of processing data, a non-transitory storage medium readable by a computer and storing a program therein for causing a computer to execute the method, and a sticker and a note (or its alternative) both made in relation, all of which are capable of securing data to be genuine.

Description of the Related Art

Japan Patent Application Publication No. 2022-094755 has suggested a data processing unit using a time stamp for securing data to be genuine.

The data processing unit is designed to include a controller, which issues a time stamp on receipt of a request of issuing a time stamp for data after having received the data. The data is secured to be genuine due to the time stamp.

However, in the case that unauthorized access is made to the controller in the data processing unit, it would be impossible to secure data to be genuine even by the time stamp.

If unauthorized access to the controller can be shut out, it would be possible to secure data to be genuine by the time stamp. Such shut-out is actually difficult or impossible, and thus, the Publication does not refer to a defense against unauthorized access.

SUMMARY OF THE INVENTION

In view of the above-mentioned problem in the conventional data processing unit, it is an exemplary object of the present invention to provide a system for authenticating data, a data processing unit, a method of processing data, a non-transitory storage medium readable by a computer and storing a program therein for causing a computer to execute the method, and a sticker and a note (or its alternative) both made in relation, all of which are capable of securing data to be genuine.

Almost data in information space is supposed to be duplicable or rewritable so far, and thus, data has not been required to be genuine.

Presently, there has been developed a technology such as blockchain for not allowing data to be falsified or a technology for securing monotonicity, there appears a digital currency in digital space such as Bitcoin (BTC).

In accordance with the regulation ERC721 of Ethereum having appeared following Bitcoin, it is possible to link any information to each of tokens by assigning a pointer variable to a token. Thus, uniqueness and non-substitution are now accomplished with the result that a non-fungible token (NFT) and its related services have been developed.

However, in most of tokens, a pointer of a pointer variable is linked to data (for instance, digital art) in an external database not related to a data structure of Ethereum.

Thus, data stored in the external database has a risk of being falsified or hacked, and hence, even though data is non-fungible with respect to an algorithm, data is not secured to be genuine with respect to a data structure.

The present invention suggests data to be linked with characteristics in a physical space in order to secure data to be highly genuine.

It is obvious that any characteristic has uniqueness in a physical space.

For instance, a coin not assigned a number such as a serial number assigned to a note can be deemed as fungible in a daily life, but coins are not equal to one another with respect to a physical characteristic at a micro-structure level.

On the other hand, a time has universal uniqueness. Probability by which a plurality of incidents concurrently happens is almost zero under a unit time having high accuracy. Accordingly, a time at which an incident happened can be deemed to have uniqueness.

In quantum theory, a smallest unit of a time is Plank time Tp. Plank time Tp is uniquely determined by both a Plank length and a velocity of light in vacuum, and is defined as follows.

$$Tp=(HG/C^5)^{1/2}=5.39116(13)\times10^{-44} \text{ s}$$

(H: Dirac constant, G: gravitational constant, C: velocity of light in vacuum)

For instance, one second is defined with Plank time Tp as follows.

$$1 \text{ second}=1.855\times10^{43}Tp$$

Thus, it is almost impossible for a plurality of incident to concurrently happen within one Plank time Tp.

The present invention employs time data based on a clock having a high accuracy to thereby secure any data to be highly genuine.

In a first exemplary aspect of the present invention, there is provided a system for authenticating data, including a first data processing unit used by a user, and a second data processing unit used by an authenticator, the first data processing unit including a converter for converting data designated by the user into a hash value, and a user-side communication apparatus making communication with the second data processing unit through a network, the second data processing unit including an authenticator-side communication apparatus making communication with the user-side communication apparatus through the network, a controller, and a clock for notifying a time at which the second data processing unit received the hash value from the first data processing unit, to the controller, the clock consisting of a clock having a resolution having a highest accuracy at that time, the controller making a time stamp token including information in which the hash value and the time at which the hash value was received are integrated, and transmitting the time stamp token to the first data processing unit through the authenticator-side communication apparatus.

For instance, the clock is comprised of a cryogenic optical lattice clock.

It is preferable that the first data processing unit is comprised of a cellular phone.

It is preferable that the second data processing unit further includes a printing device, in which case, the controller prints the time stamp token onto a medium by means of the printing device.

It is preferable that the second data processing unit further includes an encrypter, in which case, the controller converts the time stamp token into cryptograph through the encrypter, and prints the cryptograph onto a medium by means of the printing device.

For instance, the cryptograph is comprised of electronic watermark.

It is preferable that the second data processing unit further includes a decoder, in which case, the decoder decodes cryptograph having been converted by the encrypter.

For instance, the medium is comprised of a sticker.

It is preferable that the sticker has such a structure that data stored in the time stamp token is destroyed when the sticker is peeled off an object after the sticker was glued onto the object.

In a second exemplary aspect of the present invention, there is provided a note or its alternative onto which a time stamp token is printed, the time stamp token including data being designated by a user and converted into a hash value, and data indicative of a time at which the time stamp token was printed onto the note or its alternative, the time being clocked by means of a clock having a resolution having a highest accuracy at that time.

In a third exemplary aspect of the present invention, there is provided a data processing unit including a communication apparatus for making communication with a data processing unit of a user through a network, a controller, and a clock informing the controller a time at which data was received from the data processing unit of a user, the communication apparatus receiving a hash value transmitted from the data processing unit of a user, the clock consisting of a clock having a resolution having a highest accuracy at that time, the controller making a time stamp token including information in which the hash value and the time at which the hash value was received are integrated, and transmitting the time stamp token to the data processing unit of a user through the communication apparatus.

In a fourth exemplary aspect of the present invention, there is provided a method of processing data comprised of a hash value received from a data processing unit of a user through a network, including acquiring time data indicative of a time at which the hash value was received from the data processing unit of a user, making a time stamp token including information in which the hash value and the time data are integrated, and transmitting the time stamp token to the data processing unit of a user, the time being clocked by means of a clock having a resolution having a highest accuracy at that time.

In a fifth exemplary aspect of the present invention, there is provided a non-transitory storage medium readable by a computer and storing a program therein for processing data comprised of a hash value received from a data processing unit of a user through a network, wherein the program causes a computer to carry out acquiring time data indicative of a time at which the hash value was received from the data processing unit of a user, making a time stamp token including information in which the hash value and the time data are integrated, and transmitting the time stamp token to the data processing unit of a user, the time being clocked by means of a clock having a resolution having a highest accuracy at that time.

The present invention provides advantages as follows.

The present invention makes it possible to issue a time stamp token in both a digital space and a physical space, which token includes time data provided by a clock having a highly accurate resolution as physical characteristic to an object to be authenticated. Thus, it is now possible to secure uniqueness, authenticity and non-fungibility for all objects existing in both a digital space and a physical space.

In addition, the present invention makes it possible to issue a sufficiently genuine printed matter (official certificate) such as a paper or a sticker (a seal).

The above and other objects and advantageous features of the present invention will be made apparent from the following description made with reference to the accompanying drawings, in which like reference characters designate the same or similar parts throughout the drawings.

DESCRIPTION OF THE EXEMPLARY EMBODIMENTS

Exemplary embodiments in accordance with the present invention will be explained hereinbelow with reference to drawings.

First Exemplary Embodiment

Figure 1:
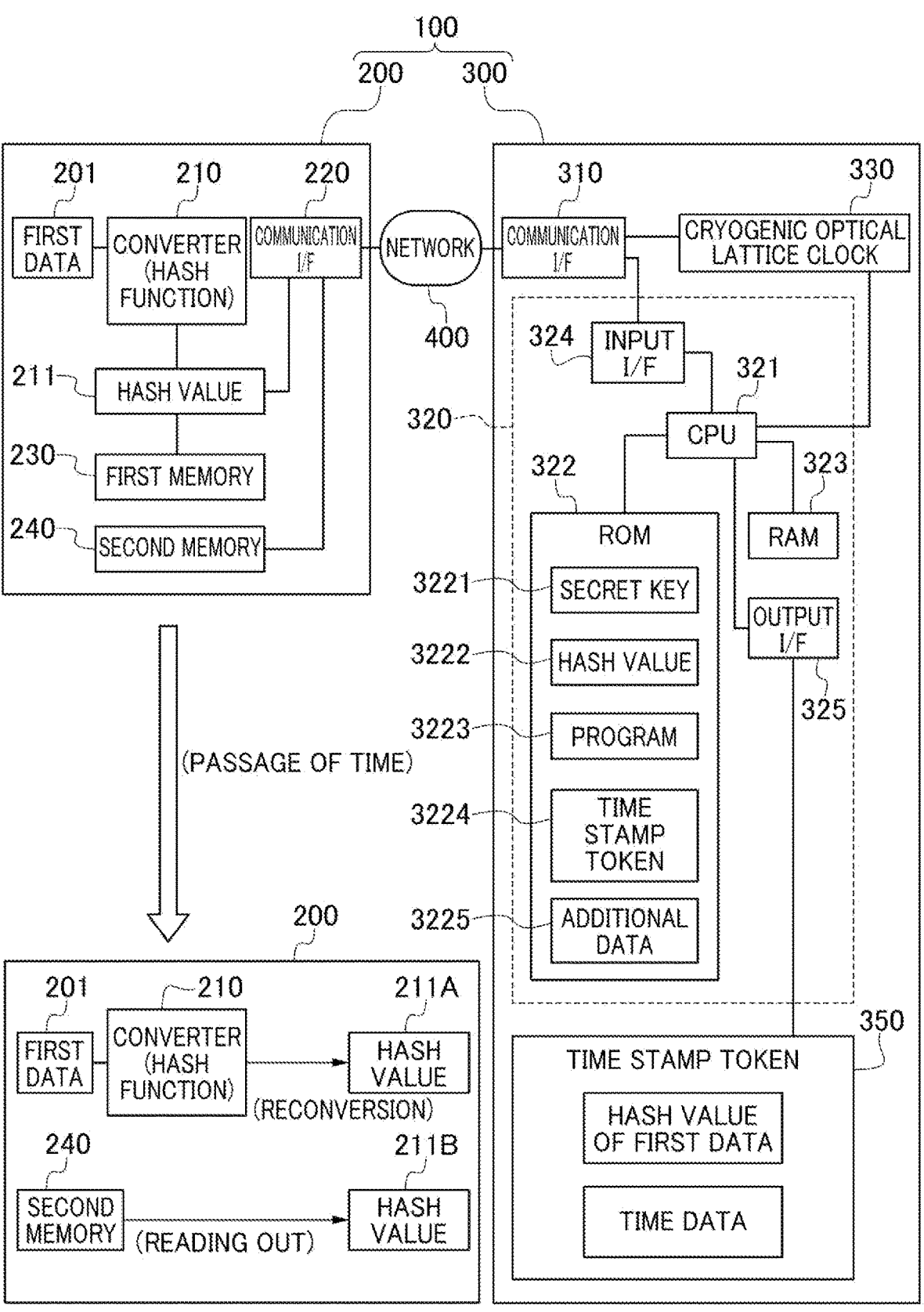
FIG. 1 is a block diagram of a system for authenticating data in accordance with the first exemplary embodiment of the present invention.

FIG. 1 is a block diagram of a system 100 for authenticating data in accordance with the first exemplary embodiment of the present invention.

The data-authenticating system 100 is designed to include a first data processing unit 200 used by a user and a second data processing unit 300 used by an authenticator.

The first data processing unit 200 and the second data processing unit 300 are linked with each other through a network 400, and thus, they can make mutual radio-signal communication with each other.

The first data processing unit 200 includes a converter 210 for converting data designated by a user into a hash value 211 by means of a hash function (for instance, SHA-2 and SHA-3), a user-side communication interface 220 for making communication with a later-mentioned authenticator-side communication interface 310 of the second data processing unit 300 through the network 400, a third memory 230 for storing therein the hash value 211 having been converted by the converter 210, and a fourth memory 240 for storing therein a later-mentioned time stamp token 350 having been transmitted from the second data processing unit 300.

The second data processing unit 300 includes an authenticator-side communication interface 310 for making communication with the user-side communication interface 220 of the first data processing unit 200 through the network 400, a controller 320 accomplishing various actions including making the time stamp token 350, and a cryogenic optical lattice clock 330 as a clock for providing time data to the controller 320.

The controller 320 is comprised of a central processing unit (CPU) 321, a first memory 322 comprised of a read only memory (ROM), a second memory 323 comprised of a random access memory (RAM), an input interface 324 for transmitting commands and/or data having been input thereinto through the authenticator-side communication interface 310, to the central processing unit 321, and an output interface 325 through which results (for instance, the time stamp token 350) of actions having been executed by the central processing unit 321 is output.

The first memory 322 stores therein both a program to be executed by the central processing unit 321, and unrewritable data. Specifically, the first memory 322 includes a secret key storage area 3221 for storing therein a secret key to be used for issuing a time stamp token, a hash value storage area 3222 for storing therein a hash value 211 having been transmitted from the first data processing unit 200, a program storage area 3223 for storing therein various control programs (applications), a time stamp token storage area 3224 for storing therein the time stamp token 325, and an additional data storage area 3225 for storing additional data necessary for the central processing unit 321 to operate.

A program for executing a method of making a time stamp token 350 (see later-mentioned FIG. 2) is stored in the program storage area 3223. The time stamp token 350 is made in accordance with the program.

Such a program may be presented through a non-transitory storage medium readable by a computer.

In the specification, the term "storage medium" means any medium which can store or record data and programs therein. The term "storage medium" includes, for instance, a disk-shaped recorder such as CD-ROM (Compact Disk-ROM) or PD, a magnetic tape, MO (Magneto Optical Disk), DVD-ROM (Digital Video Disk-Read Only Memory), DVD-RAM (Digital Video Disk-Random Access Memory), a floppy disk, a memory chip such as RAM (Random Access Memory) or ROM (Read Only Memory), EPROM (Erasable Programmable Read Only Memory), EEPROM (Electrically Erasable Programmable Read Only Memory), smart media (Registered Trade Mark), a flush memory, a rewritable card-type ROM such as a compact flush card, a hard disk, and any other suitable means for storing a program therein.

A hard disc equipped in a server may be employed as a storage medium. It is also possible to accomplish the storage medium in accordance with the present invention by storing the above-mentioned computer program in such a storage medium as mentioned above, and reading the computer program by other computers through a network.

The second memory 323 stores therein various data and parameters, and presents a working area to the central processing unit 321. That is, the second memory 323 stores data temporarily necessary for the central processing unit 321 to execute a program (for instance, a program for making the time stamp token 350).

The central processing unit 321 reads the program out of the program storage area 3223 in the first memory 322, and executes the program. Thus, the central processing unit 321 operates in accordance with the program stored in the first memory 322. In the first exemplary embodiment, the first memory 322 stores in the program storage area 3223 a program for causing the central processing unit 431 to carry out a method of making the time stamp token 350, and the central processing unit 321 executes the program to thereby carry out the method to make the time stamp token 350 as mentioned later.

On receipt of the hash value 211 from the first data processing unit 200, the authenticator-side communication interface 310 transmits a signal indicative of having received the hash value 211, to the cryogenic optical lattice clock 330. The cryogenic optical lattice clock 330 makes time data indicative of a time at which the cryogenic optical lattice clock 330 received the signal, and transmits the time data to the central processing unit 321.

The cryogenic optical lattice clock 330 is selected as a clock presently having a highest accuracy.

The cryogenic optical lattice clock 330 is one of atomic clocks. The cryogenic optical lattice clock 330 employs laser beams to shut cooled strontium atoms in an interference pattern of the laser beams called optical lattice to thereby measure oscillation of the atoms. The cryogenic optical lattice clock 330 has an accuracy highly greater than that of a cesium atomic clock, and has an error per a second equal to or smaller than 1/N second wherein N indicates several billions.

Figure 2:
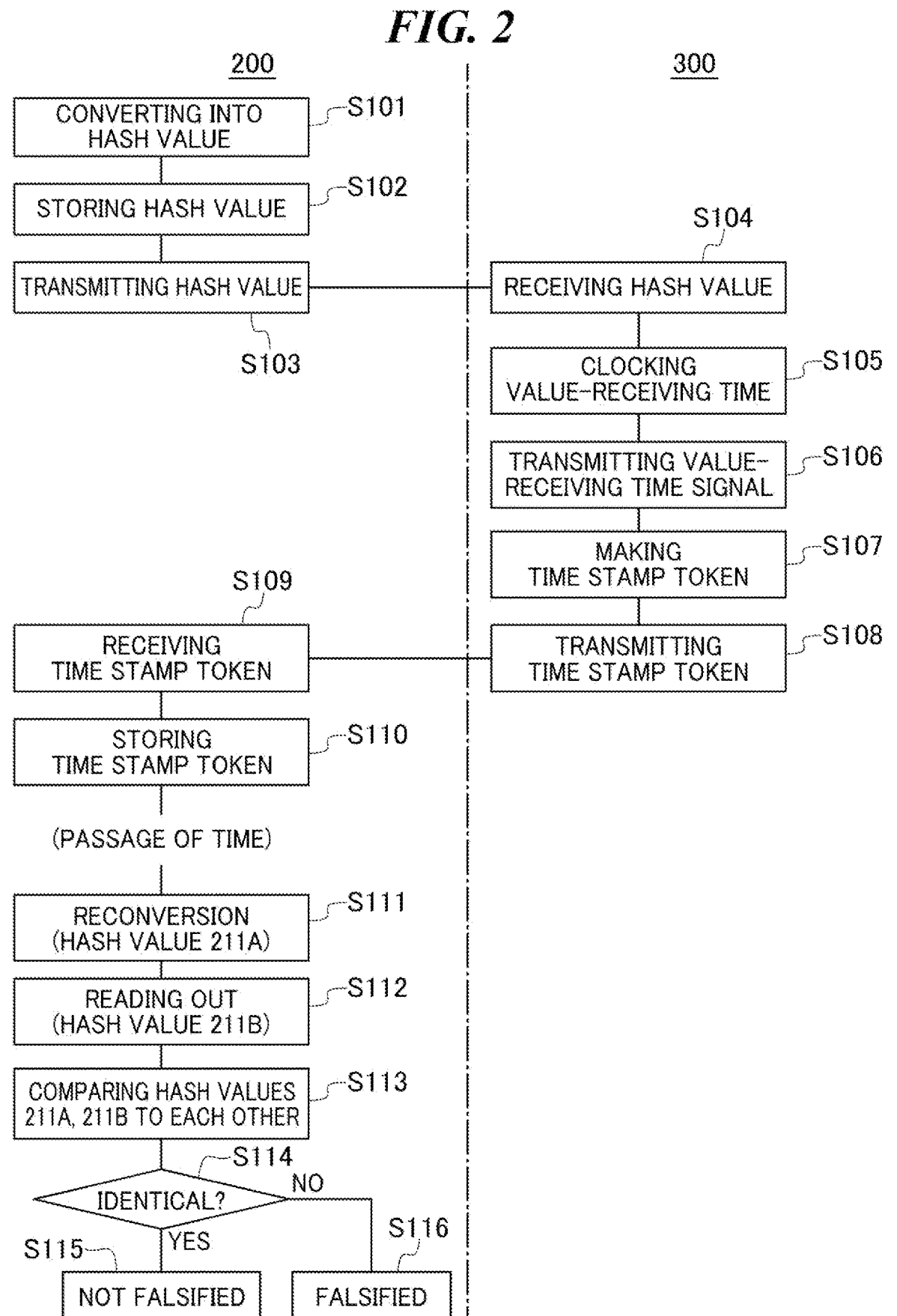
FIG. 2 is a flowchart showing an operation of a system for authenticating data in accordance with the first exemplary embodiment of the present invention.

FIG. 2 is a flowchart showing the steps to be carried out by the data authenticating system 100. Hereinbelow, an operation of the data-authenticating system 100 is explained with reference to FIGS. 1 and 2.

First, a user prepares first data 201 including electronic data of an object which the user wants to be authenticated. The object includes all of two-dimensional and three-dimensional matters as well as digital contents. For instance, digital contents include digital currency (cryptocurrency), programming codes, moving and static images, sounds and all of digital data. For instance, a two-dimensional object includes a picture, a drawing and document, and a three-dimensional object includes a sculpture, jewel, and living beings such as plant and animal.

The user inputs the first data 201 into the converter 210. The converter 210 is designed to include a hash function. The first data 201 is converted into a hash value 211 through the hash function (Step S101).

The hash value 211 is stored in the third memory 230 (Step S102), and further, is transmitted to the authenticator-side communication interface 310 of the second data processing unit 300 from the user-side communication interface 220 through the network 400 (Step S103).

On receipt of the hash value 211 from the first data processing unit 200 (Step S104), the second data processing unit 300 causes the authenticator-side communication interface 310 to transmit a signal indicative of having received the hash value 211, to the cryogenic optical lattice clock 330. The cryogenic optical lattice clock 330 clocks a value-receiving time at which the hash value 211 was received (Step S105), and transmits a signal indicative of the value-receiving time to the central processing unit 321 (Step S106).

On receipt of the signal indicative of the value-receiving time from the cryogenic optical lattice clock 330, the central processing unit 321 reads a program for making a time stamp token out of the program storage area 3223 of the first memory 322, and makes a time stamp token 350 in accordance with the thus read-out program (Step S107).

A secret key read out of the secret key storage area 3221 is employed for making the time stamp token 350.

The time stamp token 350 includes the hash value 211 having been converted from the first data 201, and data indicative of the value-receiving time having been received from the cryogenic optical lattice clock 330.

The central processing unit 321 stores the time stamp token 350 in the time stamp token storage area 3224 of the first memory 322, and further, transmits the time stamp token 350 to the first data processing unit 200 through the authenticator-side communication interface 310 (Step S108).

On receipt of the time stamp token 350 from the second data processing unit 300 (Step S109), the first data processing unit 200 stores the time stamp token 350 in the fourth memory 240 (Step S110).

When a predetermined period of time (for instance, a year) has passed after having received the time stamp token 350 from the second data processing unit 300, a user can check whether the first data 201 is genuine or not, that is, whether the first data 201 is falsified or not, as follows.

First, the user converts again the first data 201 into a hash value 211A through the converter 210 (Step S111).

Then, the user reads the time stamp token 350 out of the fourth memory 240 to thereby get a hash value 211B of the first data 201 having been transmitted from the second data processing unit 300 (Step S112).

Then, the user compares the hash values 211A and 211B with each other (Step S113) to judge whether they are identical with each other (Step S114).

If the hash values 211A and 211B are identical with each other (YES in Step S114), it is understood that the first data 201 has not been falsified (Step S115).

On the other hand, if the hash values 211A and 211B are not identical with each other (NO in Step S114), it is understood that the first data 201 has been falsified (Step S116).

The data-authenticating system 100 in accordance with the first exemplary embodiment makes it possible to judge whether data is falsified or not with high accuracy by making a time stamp token through the use of the cryogenic optical lattice clock 330 as a clock presently having a most accurate resolution.

Furthermore, it is possible to accomplish highly accurate authentication in a digital space through the use of time data as a characteristic in a physical space.

Thus, it is possible to provide uniqueness, authenticity and non-fungibility to all objects existing in both physical and digital spaces.

It should be noted that the system 100 is not to be limited to the above-mentioned structure, but can have many variations.

Data to be converted into the hash value 211 and transmitted to the second data processing unit 300 may include, other than the first data 201, data inherent to the user and/or data about characteristic owned only by the user. For instance, a passport number, a number of a driver's license, tooth profile and/or fingerprint of the user may be added.

For instance, if an object to be authenticated is a pipe as a keepsake of a user's grandfather, three-dimensional data including a tooth profile of the grandfather's mouthpiece may be added to data of which the time stamp token 350 is to be made.

By adding data inherent to a user to the time stamp token 350, the first data 201 is stored in a condition that it is linked with user data (for instance, a passport number of a user) as a characteristic in a physical space. Since any characteristic in a physical space is secured to have uniqueness, it is possible for the first data 201, an object to be authenticated, to be highly secured genuine.

Though the second data processing unit 300 is designed to be an element of the data-authenticating system 100 in the first exemplary embodiment, the second data processing unit 300 can be used alone as an apparatus for authentication.

The cryogenic optical lattice clock 330 is employed as a clock presently having a most accurate resolution in the first exemplary embodiment, but if a clock having a resolution having accuracy higher than that of the cryogenic optical lattice clock 330 is developed, the clock is used in place of the cryogenic optical lattice clock 330.

A plurality of incidents may happen within a minimum period of time in a resolution of the cryogenic optical lattice clock 330. Preparing for such a case, a rule for determining an order among incidents is in advance prepared, and a distinguishable code (for instance, a number) is assigned to each of incidents in accordance with the predetermined rule.

The first data processing unit 200 may be comprised of any apparatus, unless it has all of the above-mentioned functions of the first data processing unit 200. For instance, the first data processing unit 200 may be comprised of a desk-top type computer, a lap-top type computer, a tablet or a cellular phone.

Figure 3:
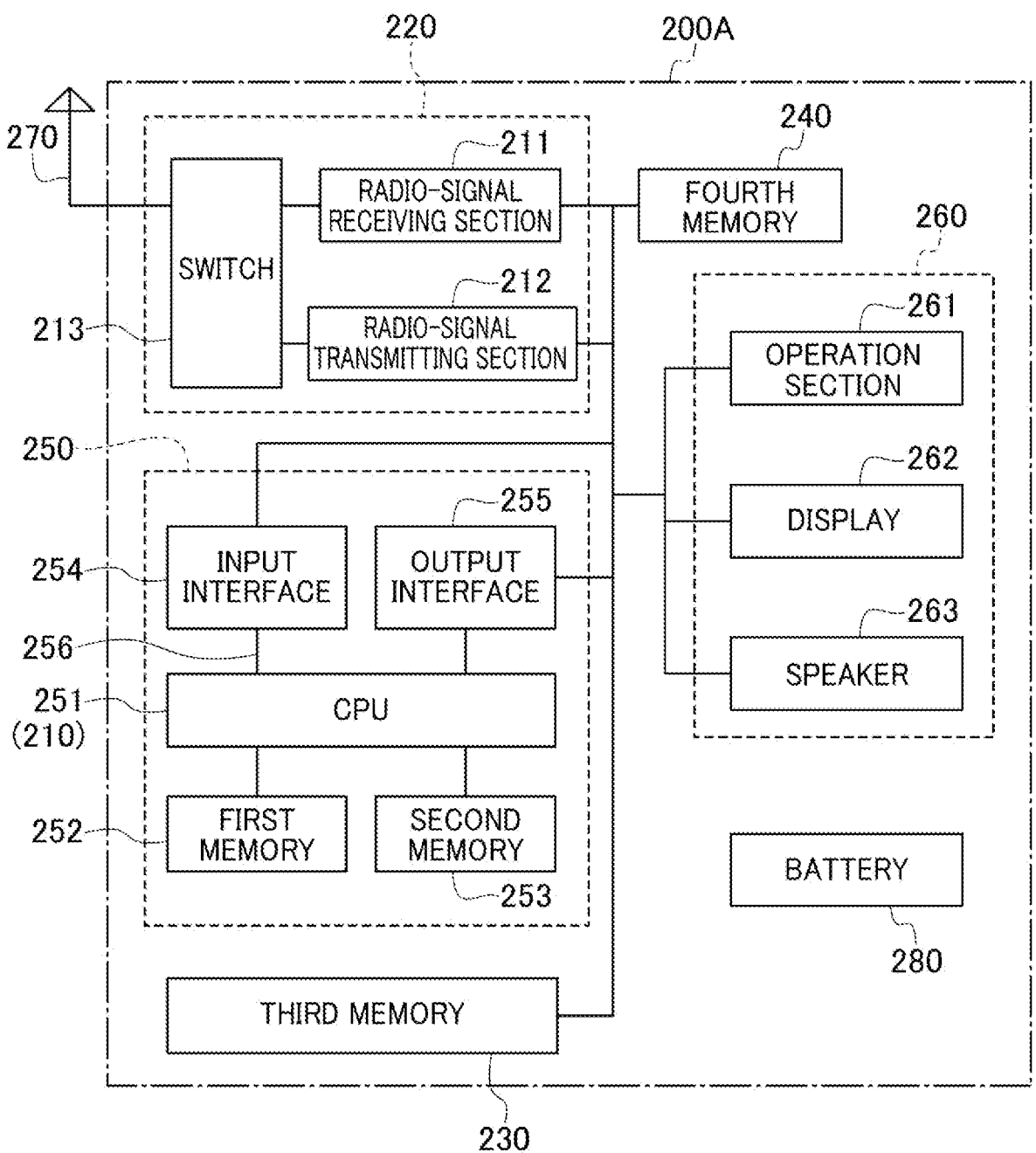
FIG. 3 is a block diagram of an exemplary structure of a cellular phone acting as a first data processing unit in a system for authenticating data in accordance with the first exemplary embodiment of the present invention.

FIG. 3 is a block diagram of an exemplary structure of a cellular (mobile) phone 200A working as the first data processing unit 200.

The cellular phone 200A includes a communication interface 220, a control unit 250, a third memory 230, a fourth memory 240, an input/output section 260, an antenna 270, and a battery 280 for providing electric power to those elements.

The communication interface 220 is connected to the antenna 270 for receiving data from and transmitting data to other cellular phones (including the second data processing unit 300) in radio-signal communication through the antenna 270.

The communication interface 220 includes a radio-signal receiving section 211, a radio-signal transmitting section 212, and a switch 213.

The radio-signal receiving section 211 demodulates data having been received from other cellular phones, and transmits the thus demodulated data to the control unit 250. The radio-signal transmitting section 212 modulates data having been output from the control unit 250, and transmits the modulated data to the other cellular phones through the antenna 270. The switch 213 receives an instruction signal from the control unit 250, and selects one of signal reception and signal transmission in accordance with the received instruction signal.

The control unit 250 is comprised of a central processing unit (CPU) 251, a first memory 252 comprised of a read only memory (ROM), a second memory 253 comprised of a random access memory (RAM), an input interface 254 for transmitting commands and/or data having been input into the control unit 250, to the central processing unit 251, an output interface 325 through which results of actions having been executed by the central processing unit 251 is output, and buses 256 for electrically connecting the central processing unit 251 to each of the first memory 252, the second memory 253, the input interface 254 and the output interface 255.

The control unit 250 has the same function as those of the controller 320 of the second data processing unit 300.

The central processing unit 251 reads a program for converting data into a hash value, out of the first memory 252, and converts the first data 210 into a hash value in accordance with the program. That is, the control unit 250 (the central processing unit 251) acts also as the converter 210.

The input/output section 260 includes an operation section 261, a display 262, and a speaker 263.

The operation section 261 is comprised of a ten-key, for instance. Data is input into the cellular phone 200A through the operation section 261.

The display 262 is comprised of a liquid crystal display (LCD), for instance. Computation carried out by the control unit 250 and other data are displayed on the display 262.

Sound data having been transmitted from other cellular phones are output through the speaker 263.

The third memory 230 acts as an external memory to the control unit 250. The hash value 211 made by the control unit 250, computation carried out by the control unit 250 and other data are stored in the third memory 230.

The time stamp token 350 having been transmitted from the second data processing unit 300 is stored in the fourth memory 240.

Second Exemplary Embodiment

Figure 4:
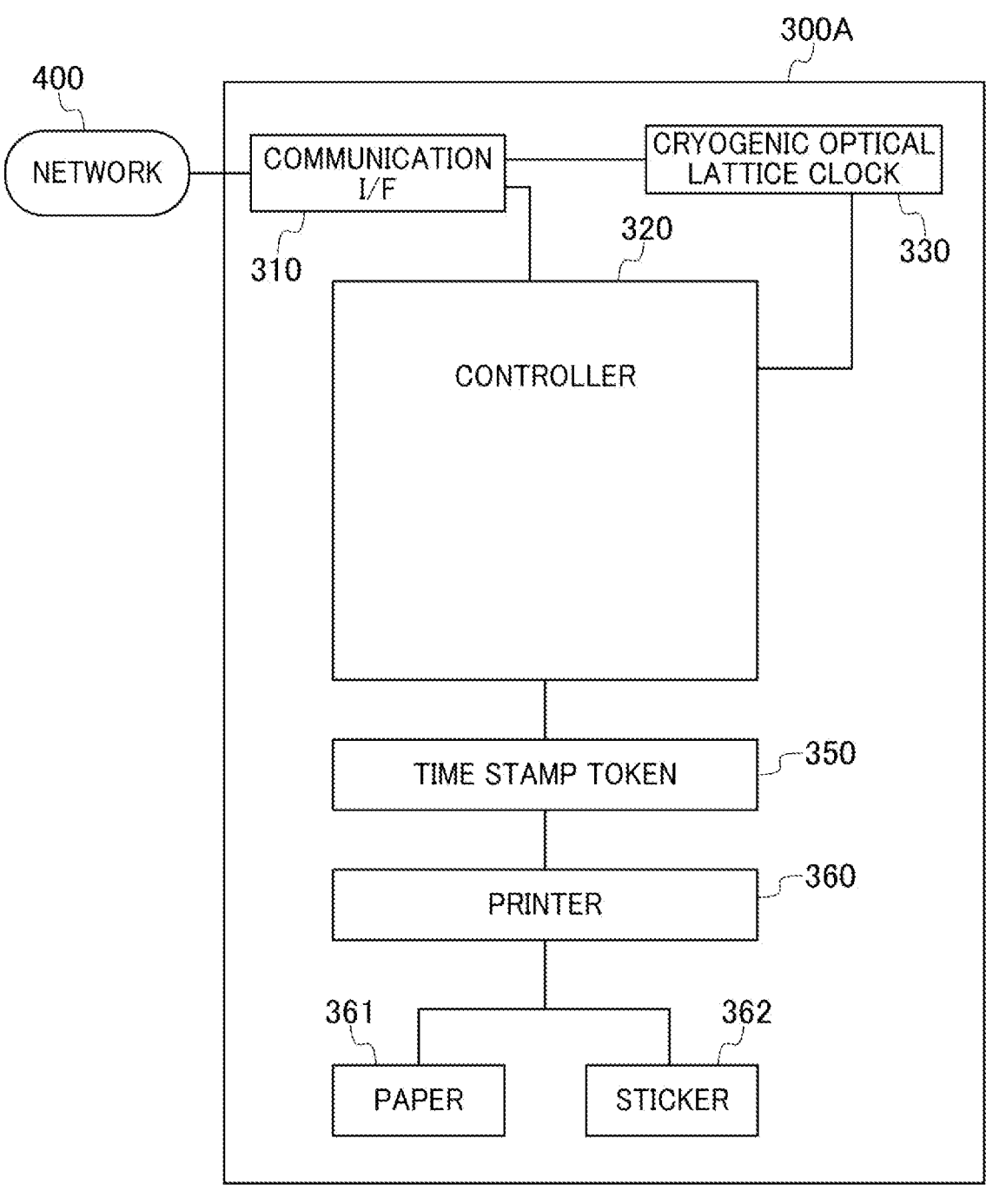
FIG. 4 is a block diagram of a second data processing unit to be used in a system for authenticating data in accordance with the second exemplary embodiment of the present invention.

FIG. 4 is a block diagram of a second data processing unit 300A to be used in a data-authenticating system in accordance with the second exemplary embodiment of the present invention.

The data-authenticating system in accordance with the second exemplary embodiment is identical in structure with the data-authenticating system 100 in accordance with the first exemplary embodiment except employing the second data processing unit 300A illustrated in FIG. 4 in place of the second data processing unit 300 used in the data-authenticating system 100.

The second data processing unit 300A additionally includes a printer 360 in comparison with the second data processing unit 300 in the first exemplary embodiment.

The printer 360 is controlled in operation by the central processing unit 321. The printer 360 has a function of printing the time stamp token 350 made by the central processing unit 321 onto a medium.

A medium includes a paper 361 or a sticker 362, for instance. The paper 361 and/or the sticker 362 on which the time stamp token 350 is printed is transmitted to a user.

The user stores the paper 361 and/or the sticker 362 on which the time stamp token 350, for the sake of authentication to be carried out later. In particular, it is necessary to stick the sticker 362 onto an object to be authenticated in a case that the time stamp token 350 is printed onto the sticker 362.

The sticker 362 may be designed to have such a structure that data stored in the time stamp token 350 is destroyed when the sticker 362 is peeled off an object after the sticker 362 was glued onto the object.

For instance, the time stamp token 350 is designed to be in the form of ASIC (Application Specific Integrated Circuit), and is aluminum-deposited onto an object. This structure ensures that data stored in the time stamp token 350 is destroyed when the time stamp token 350 is peeled off the object.

As mentioned above, the second exemplary embodiment makes it possible to authenticate data in a physical space as well as the time stamp token 350 as digital content, by printing the time stamp token 350 onto the paper 361 and/or the sticker 362.

Even if data stored in the time stamp token 350 leaks outside, a user can show a printed matter (the paper 361 and/or the sticker 362) to thereby prove that he/she is a proper owner of an object to be authenticated.

In the second exemplary embodiment, the second data processing unit 300A is an element of the data-authenticating system, but the second data processing unit 300A can be used by itself.

For instance, a government of a certain country can make the time stamp token 350 storing therein a serial number and other data, and issue a note on which the time stamp token 350 is printed.

As an alternative, a company may make the time stamp token 350 storing therein a serial number and other data, and issue a gold note, a pre-paid card or other substitutes for a note.

It is preferable to use the printer 360 capable of printing such a note that it is possible to prevent forgery thereof. For instance, high technology for preventing forgery of a note, such as a watermark and a latent image used in a National Printing Bureau, is preferable used.

Third Exemplary Embodiment

Figure 5:
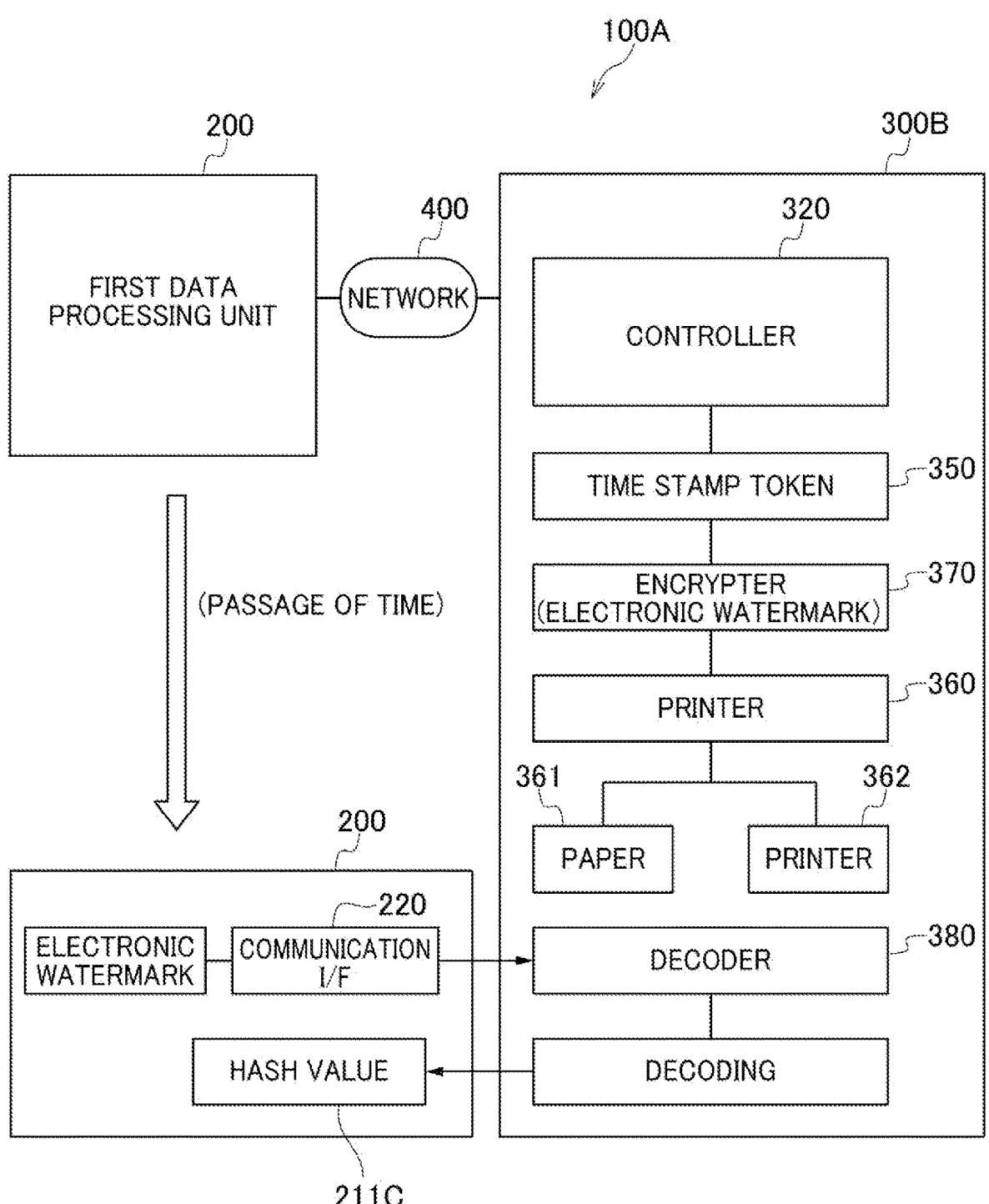
FIG. 5 is a block diagram of a system for authenticating data in accordance with the third exemplary embodiment of the present invention.

FIG. 5 is a block diagram of a system 100A for authenticating data in accordance with the third exemplary embodiment of the present invention. The system 100A in accordance with the third exemplary embodiment is identical in structure with the system in accordance with the second exemplary embodiment except employing a second data processing unit 300B illustrated in FIG. 5 in place of the second data processing unit 300A used in the system in accordance with the second exemplary embodiment.

The second data processing unit 300B in the third exemplary embodiment is designed to additionally include an encrypter 370 and a decoder 380 in comparison with the second data processing unit 300A.

The encrypter 370 converts the time stamp token 350 made by the central processing unit 321 into cryptograph (code or cryptogram).

For instance, digital watermark (electron transparency) may be selected as cryptograph. Digital watermark means a technology for embedding particular data into various digital contents in such a condition that a man cannot identify the data through his/her perception.

The printer 360 prints the thus encrypted time stamp token 350 onto the paper 361 and/or the sticker 362 in accordance with instructions having been received from the central processing unit 321.

The decoder 380 decodes the time stamp token 350 having been encrypted by the encrypter 370.

The encrypted time stamp token 350 is transmitted to a user as digital content, or as a printed matter comprised of the paper 361 and/or the sticker 362 on which the time stamp token 350 has been printed. As an alternative, both the digital content and the printed matter are transmitted to a user.

A user transmits the encrypted time stamp token 350 to the second data processing unit 300B to request the encrypted time stamp token 350 to be decoded by the decoder 380.

Figure 6:
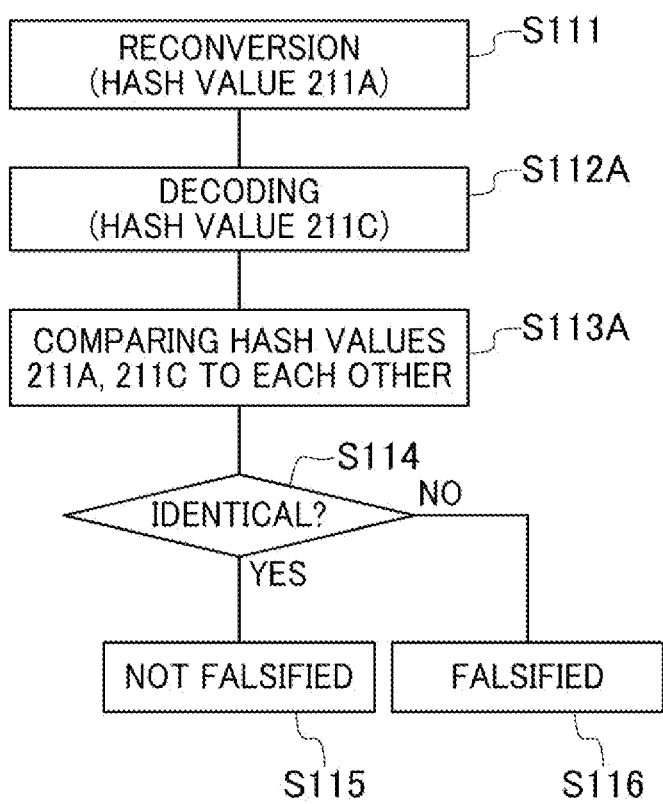
FIG. 6 is a partial flowchart showing an operation of a system for authenticating data in accordance with the third exemplary embodiment of the present invention.

FIG. 6 is a partial flowchart showing an operation of the data authenticating system 100A. The operation of the system 100A is explained hereinbelow with reference to FIGS. 5 and 6.

The steps to be carried out for a user to receive the hash value 211A are identical with the steps illustrated in FIG. 2.

For authentication of an object, a user converts the first data 201 again into the hash value 211A through the converter 210 (Step S111).

Then, a user requests the second data processing unit 300B to decode the encrypted time stamp token 350 (electronic data, the paper 361 or the sticker 362) having been received from the second data processing unit 300B. The second data processing unit 300B causes the decoder 380 to decode the encrypted time stamp token 350, and transmits the decoded time stamp token 350 to a user (the first data processing unit 200) as a hash value 211C (Step S112A).

Then, a user compares the hash values 211A and 211C with each other (Step S113A) to judge whether they are identical with each other (Step S114).

If the hash values 211A and 211C are identical with each other (YES in Step S114), it is understood that the first data 201 has not been falsified (Step S115).

On the other hand, if the hash values 211A and 211C are not identical with each other (NO in Step S114), it is understood that the first data 201 has been falsified (Step S116).

As explained above, the system 100A in accordance with the third exemplary embodiment enhances confidentiality of data (the first data 201) stored in the time stamp token 350, since the time stamp token 350 is transmitted/received in an encrypted condition.

Fourth Exemplary Embodiment

As mentioned in the second exemplary embodiment, a government in a certain country can issue notes on which the time stamp token 350 storing a serial number and other data is printed. Furthermore, as mentioned in the third exemplary embodiment, the time stamp token 350 having been encrypted (for instance, electronic watermark) can be printed onto notes By issuing notes on which the time stamp token 350 is printed, the notes can be used for an economic policy of the country. Hereinbelow is explained an example.

A price is displayed on a note on which the time stamp token 350 is printed. The price is not fixed, but is designed to reduce with the lapse of a predetermined period of time after the time stamp token 350 was printed on a note.

For instance, a half-life may be chosen as a predetermined period of time, in which case, a price of a note is reduced with the lapse of a predetermined period of time (for instance, a day) in accordance with a half-life.

In the case that a half-life is chosen as an algorithm for the reduction in a price (or an amount) of a note, assuming that a half-life is one year (365 days), a rate of today relative to tomorrow in of a price of a note is 365-th root of 2 ($2^{1/365}$):1. In other words, a price or an amount of a note is reduced at a rate of ($2^{1/365}-1$) day by day. For instance, a note of 10,000 yen (JPY) is reduced next day to 9,981 yen, reduced a week later to 9,439 yen, reduced half a year later to 7,492 yen, reduced a year later to 5,000 yen, and reduced two years later to 2,500 yen.

The reduction in a price of a note in accordance with a half-life starts at the next day following a day of the issuance of the note. The issued notes are all reduced in a price day by day in accordance with a half-life. The reduction in a price of a note is circulated back to a government. That is, the reduction in a price of a note is returned back to a national treasury, and thus, a government can introduce the reduction into a national budget.

A user having received the above-mentioned note can purchase anything he/she likes with the note. A price of the note is reduced by the user's purchase, and further, is reduced with the lapse of time as mentioned above, even if a user does not purchase something.

For instance, it is assumed that Bank of Japan, a central bank in Japan, issues notes on which the time stamp token 350 is printed, and distributes the notes to each of Japanese citizens.

A presently available currency is not reduced with respect to a price (a value) and/or an amount thereof. That is, it is supposed that a presently available currency is kept with respect to a price and/or an amount thereof. Thus, wealthy people can manage their money with an interest of rate to thereby acquire more money. Their money is only partially circulated into a market, and accordingly, a market is not stimulated and thus is difficult to be activated. In other words, only monetary economy is activated, but real economy is difficult to be activated.

However, by causing a note on which the time stamp token 350 is printed to have a character "a price thereof is reduced with the lapse of time", it is possible to stimulate and thereby promote consumption activity.

As a result, in an economic territory in which a half-life reduction character is given to notes, notes are much circulated, economy is stimulated, and an entire market can become wealth. A present society in which wealthy people becomes more wealthy is expected to be turned into a society in which people involved in a market can all become wealthy.

In 2020, Bank of Japan issued about 120,000,000,000,000 yen (JPY) currency by quantitative easing (QE). These currencies are circulated to financial institution such as city banks.

In an economic policy to which the data-authenticating system 100A is applied, notes (on which the time stamp token 350 is printed) equal in an amount to the above-mentioned QE is distributed directly to national citizens as universal basic income (UBI). For instance, Bank of Japan (central bank in Japan) directly transmits a constant amount of currency (for instance, 200,000 yen) once a month to each of national citizens. This makes per a month credit creation calculated by the following formula.

$$200{,}000 \times \text{number of national citizens}$$

In view of national citizens, a policy of direct distribution of currency in place of purchase of national bonds from city banks will be highly supported. In the case that a reduction rate due to a half-life is greater than an interest rate, notes will not be saved, and thus, consumption will be promoted and economic is stimulated, resulting in that a market, specifically real economy can be activated.

England Bank (central bank of United Kingdom) releases that consumption activity by national citizens can be stimulated by carrying out buying operations directly to national citizens through legal currency (a value or a price and an amount of which are not reduced), and thus, GDP increases by 3%. Thus, an advantage of encouragement of economic activity can be expected.

As mentioned above, consumption activity of national citizens is promoted by carrying out buying operations even through currency whose value and amount are not reduced. Since consumption activity is promoted also by the notes (whose price and amount are reduced with the passage of time) in addition to the promotion of consumption activity by legal currency, GDP is expected to further increase.

Notes having a value of 200,000 yen distributed every month to national citizens by the universal basic income (UBI) policy is reduced day by day in accordance with a half-life. A reduced amount (price) of those notes is calculated everyday by the central bank, and is added to assets of the central bank. For instance, when a year as a half-life has passed, a half of the total amount of credit creation (200,000×number of national citizens per a month) is returned back to the central bank.

TABLE 1

| unit: 1,000,000,000,000 yen | | | | | | | |
| --- | --- | --- | --- | --- | --- | --- | --- |
| | 1st Year | 2nd Year | 3rd Year | 4th Year | 5th Year | 6th Year | 7th Year |
| UBI issuance | 240 | 240 | 240 | 240 | 240 | 240 | 240 |
| Collection | 0 | 120 | 180 | 210 | 225 | 233 | 237 |
| General Account | 0 | 120 | 120 | 120 | 120 | 120 | 120 |
| Surplus | 0 | 0 | 60 | 90 | 105 | 113 | 117 |

Table 1 shows a correlation among UBI issuance, collection, general account and surplus.

For instance, supposing that 2,000,000 yen is distributed to national citizens per a year, a total of 240,000,000,000,000 yen is annually created in 120,000,000 national citizens, and, as shown in Table 1, the central bank receives 120,000,000,000,000 yen (180,000,000,000,000 yen or more two or more years later) a year later. By introducing the returned notes into national treasury, it is possible to cover the annual general account (120,000,000,000,000 yen), resulting in formal accomplishment of a tax-free country.

A reduced amount of the notes in accordance with a half-life can be seemed substantially a tax. The current consumption tax system is dependent on consumption activity of consumers, and can be understood as penalty against consumption, including contradiction for national citizens to reduce consumption.

On the other hand, a tax (a reduced price of the notes) is automatically collected in the system 100A in which a price of the notes is reduced in accordance with a half-life, and accordingly, fiscal resources can be made stable. Since reduction in a price or a value of the notes in accordance with a half-life can be understood as penalty against no consumption, it is possible to expect promotion of consumption by national citizens.

It is possible to stop reduction in a price of the notes having been returned back to the central bank from national citizens. That is, it is possible to design not to reduce a collected amount of the notes. By so designing the notes, the central bank or the nation is able to spend the collected notes without reduction thereof. For instance, it is possible to cover a general account with the collected notes, and if surplus is generated, the surplus may be delivered to foreign countries, in which case, inflation is not caused in Japan. It is possible to accomplish foreign aid such as ODA (Official Development Assistance) or purchase US treasury notes, EU bonds or Chinese government bonds.

In a society in which conventional currency (legal currency) a value (a price) and/or an amount of which are not reduced with passage of time is available, wealthy people can manage their money with an interest of rate to thereby acquire more money. Their money is not circulated into a market, and accordingly, a market is not stimulated. Laborers in a society in which economy is not good cannot afford to save money. Thus, a difference between the poverty and the wealth tends to be increased.

In contrast, in a society in which currency having a price designed to be reduced in accordance with a half-life is introduced, consumption activity is promoted and economy is stimulated, resulting in that a benefit is provided to those involved in a market. In other words, a switch to the currency from current legal currency may be a big turning point at which a society having low abstraction of "a priority is given to individual benefit" is turned into a society having high abstraction of "a priority is given to all".

As having been explained so far, the system 100A can be a base for an extremely useful policy to a society, and has a possibility of solving present economic problems.

An economic policy employing notes on which the time stamp token 350 was printed has been explained. The same economic policy can be accomplished by using cryptocurrency in place of the above-mentioned notes (actual currency). By employing cryptocurrency, it is possible to collect the reduction of notes in price more smoothly than using notes as legal currency.

Figure 7:
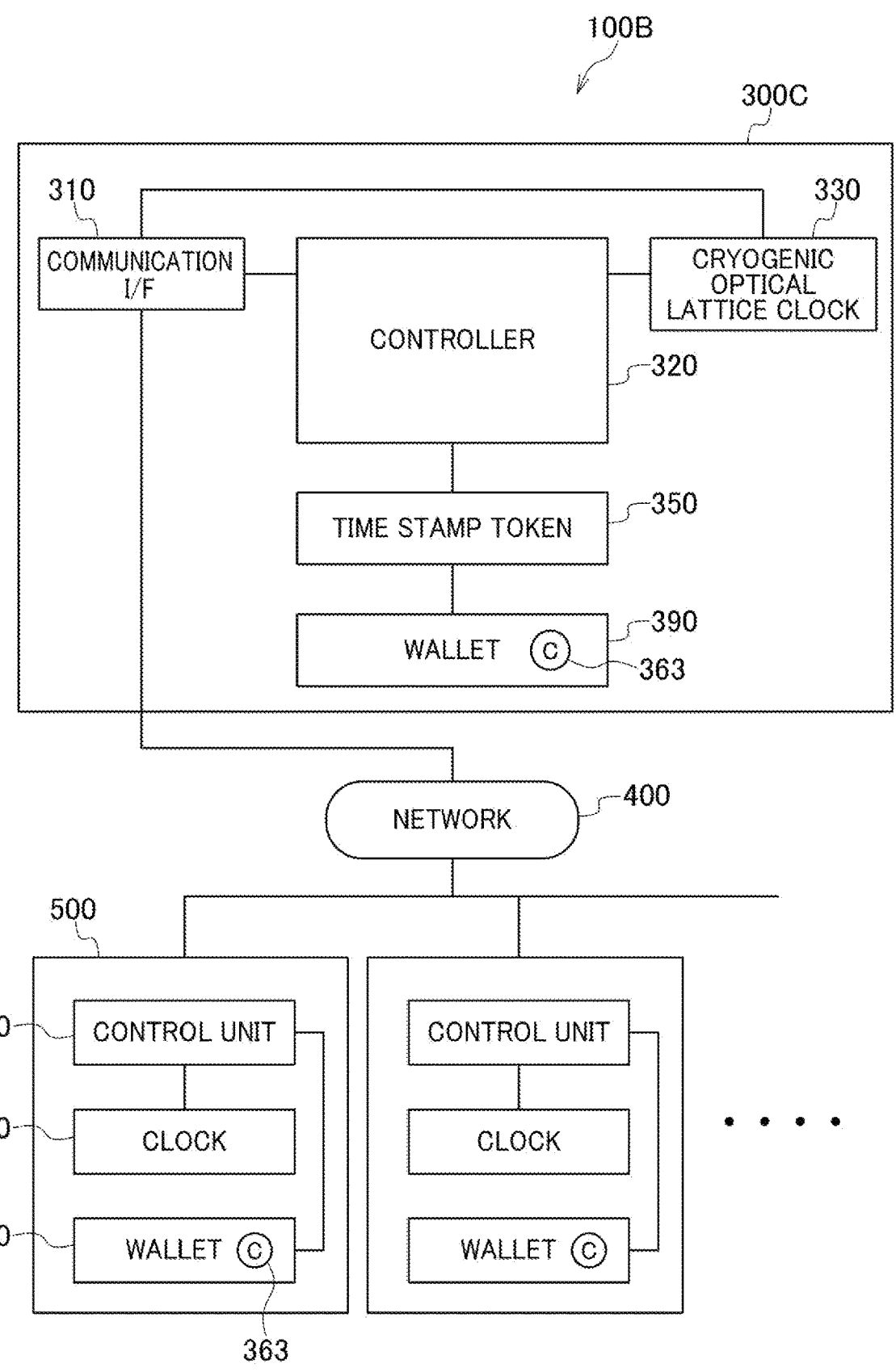
FIG. 7 is a block diagram of a system for authenticating data in accordance with the third exemplary embodiment of the present invention, in which digital currency is employed in place with actual notes.

FIG. 7 is a block diagram of a system 100B for authenticating data, in which cryptocurrency (digital currency) is employed in place with actual notes.

As illustrated in FIG. 7, the system 100B for authenticating data includes a second data processing unit 300C, and a plurality of data processing units 500 owned by each of national citizens.

In comparison with the second data processing unit 300B in the first exemplary embodiment, the second data processing unit 300C additionally includes a wallet 390 for storing therein cryptocurrency 363.

The control unit 320 makes the cryptocurrency 363 storing therein data about the time stamp token 350, and stores the cryptocurrency 363 in the wallet 390.

Each of the data processing units 500 is connected in radio signal to the second data processing unit 300C through the network 400, and thus, is able to transmit radio signals to and receive radio signals from the second data processing unit 300C.

Each of the data processing units 500 includes a control unit 510 controlling operation of a data processing unit 500, a clock 520 measuring lapse of time and transmitting the measurement result to the control unit 510, and a wallet 530 as an application for storing therein the cryptocurrency 363.

Each of the data processing units 500 can be comprised of a cellular phone, for instance.

Figure 8:
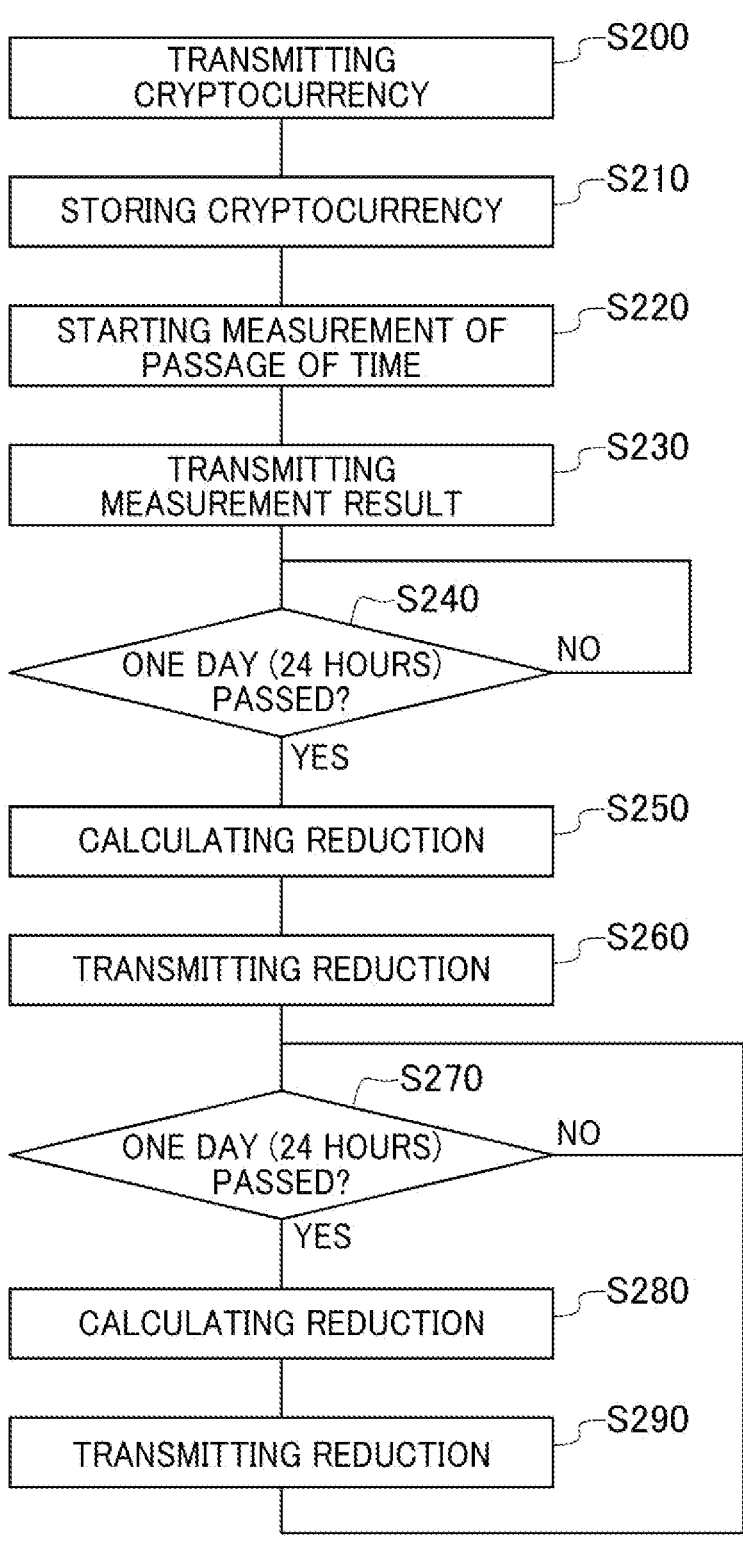
FIG. 8 is a flowchart showing an operation of the system illustrated in FIG. 7.

FIG. 8 is a flowchart showing the operation of the system 100B. Hereinbelow is explained the operation of the system 100B with reference to FIGS. 7 and 8.

The second data processing unit 300C periodically transmits the cryptocurrency 363 to each of the data processing units 500. For instance, the second data processing unit 300C transmits the cryptocurrency 363 to each of the data processing units 500 once a day, week or month (Step S200 in FIG. 8).

The cryptocurrency 363 having been received at each of the data processing units 500 is stored in the wallet 530 (Step S210 in FIG. 8).

As mentioned earlier, the cryptocurrency 363 stored in the wallet 530 of each of the data processing units 500 starts being reduced in a price from the next day of issuance thereof or storage in the wallet 530, and reduces in its price day by day in accordance with a half-life.

When the cryptocurrency 363 has transmitted to each of the data processing units 500 from the second data processing unit 300C, the clock 520 in each of the processing units 500 starts measuring passage of time starting from a time at which each of the data processing units 500 received the cryptocurrency 363 (Step S220 in FIG. 8).

The clock 520 transmits the measurement result to the control unit 510 per an hour, for instance (Step S230 in FIG. 8).

The control unit 510 judges whether a day (24 hours) has passed or not in accordance with the measurement result having been received from the control unit 510 (Step S240 in FIG. 8).

If a day (24 hours) has not yet passed after receipt of the cryptocurrency 363 by each of the processing units 500, the control unit 510 repeatedly carries out judging whether a day (24 hours) has passed or not (NO in Step S240 in FIG. 8).

If a day (24 hours) has passed after receipt of the cryptocurrency 363 by each of the processing units 500 (YES in Step S240 in FIG. 8), the control unit 510 calculates a daily reduction of the cryptocurrency 363 (Step S250 in FIG. 8).

The cryptocurrency 363 is reduced in an amount in accordance with a one-year (365 days) half-life. Accordingly, a reduced amount D in one day is calculated in accordance with the following formula (A).

$$D=R\times2^{1/365} \text{ (R: amount of the cryptocurrency 363)} \qquad (A)$$

For instance, in the case that the second data processing unit 300C transmitted the cryptocurrency 363 having a value of 10,000 yen (JPY) to each of the data processing units 500, the cryptocurrency 363 is reduced by 19 yen in a first day.

Consequently, when one day (24 hours) has passed from the receipt of the cryptocurrency 363 in each of the data processing units 500, the cryptocurrency 363 having a value of 9,981 yen is included in the wallet 530.

$$10,000-19=9,981 \text{ yen}$$

As an alternative, the cryptocurrency 363 is reduced by 561 yen in a first week (7 days).

Consequently, when one week (7 days) has passed from the receipt of the cryptocurrency 170 in each of the data processing units 500, the cryptocurrency 363 having a value of 9,439 yen is included in the wallet 530.

$$10,000-561=9,439 \text{ yen}$$

Then, the control unit 510 in each of the data processing units 500 transmits the reduced amount D of the cryptocurrency 363 in a first day to the second data processing unit 300 through the network 400 (Step S260 in FIG. 8).

After the control unit 510 in each of the data processing units 500 transmitted the reduced amount D of the cryptocurrency 363 to the second data processing unit 300C, the clock 520 in each of the data processing units 500 continues measuring passage of time starting at a time when each of the data processing units 500 has received the cryptocurrency 363, and transmits the measurement result to the control unit 510 every hour, for instance.

The control unit 510 judges whether one day (24 hours) has passed or not in accordance with the measurement result having been transmitted from the clock 520 (Step S270 in FIG. 8).

If one day (24 hours) has not yet passed since the previous transmission of the reduced amount of the cryptocurrency 363, that is, if two days (48 hours) has not yet passed since the receipt of the cryptocurrency 363 by each of the data processing units 500, the control unit 510 repeatedly judges whether one day (24 hours) has passed or not (NO in Step S270 in FIG. 8).

When one day (24 hours) has passed since the previous transmission of the reduced amount of the cryptocurrency 363 (YES in Step S270 in FIG. 8), the control unit 510 calculates a reduced amount of the cryptocurrency 363 in one day in accordance with the above-mentioned formula (A) (Step S280 in FIG. 8).

Then, the control unit 510 in each of the data processing units 500 transmits the reduced amount D of the cryptocurrency 363 in a second day to the second data processing unit 300 through the network 400 (Step S290 in FIG. 8).

As mentioned above, a reduced amount of the cryptocurrency 363 is transmitted back to the second data processing unit 300C from each of the data processing units 500 every passage of a day (24 hours).

Thereafter, the steps S270 to S290 shown in FIG. 8 are repeatedly carried out.

An amount of the cryptocurrency 363 reduces by consumption activity of a user and with passage of time. The control unit 510 always monitors a residual amount of the cryptocurrency 363 stored in the wallet 530. When a residual amount of the cryptocurrency 363 goes below a predetermined threshold (for instance, 1,000 yen), the control unit 510 transmits a request signal to the second data processing unit 300C to request the second data processing unit 300C to additionally transmit the cryptocurrency 363. On the receipt of the request signal, the second data processing unit 300C makes additional transmission of the cryptocurrency 363 (for instance, 10,000 yen) to the data processing unit 500 as well as the regular transmission of the cryptocurrency 363.

Thus, a residual amount of the cryptocurrency 363 stored in the wallet 530 is close to zero, the cryptocurrency 363 is additionally supplemented to the data processing unit 500 from the second data processing unit 300C.

As having been explained so far, it would be possible to smoothly return a reduced amount of the cryptocurrency 363 to the central bank (national treasury) by employing the cryptocurrency 363 in place of actual notes (legal notes), to thereby promote novel policies such as UBI.

In the present exemplary embodiment, the cryptocurrency 363 being reduced in a price or a value in accordance with a half-life is used as an example. Cryptocurrency being not reduced with passage of time (that is, existing cryptocurrency) may be used in place of the cryptocurrency 363, in which case, a reduced amount of cryptocurrency is not transmitted to the second data processing unit 300C, and an amount of cryptocurrency firstly transmitted to each of the data processing units 500 is maintained.

For instance, a local government may issue cryptocurrency (one of cryptocurrency designed to be reduced in accordance with a half-life and cryptocurrency designed not to be reduced with passage of time) available only in an area managed by the local government for local construction, in which case, the local government may issue notes on which the time stamp token 350 is printed, as mentioned in the second exemplary embodiment.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2023-68581 filed on Apr. 19, 2023 including specification, claims, drawings and summary is incorporated herein by reference in its entirety.

What is claimed is:

1. A system for authenticating data, including a first data processing unit used by a user, and a second data processing unit used by an authenticator, the first data processing unit including:

a converter for converting data designated by the user into a hash value; and a user-side communication apparatus making communication with the second data processing unit through a network, the second data processing unit including:

an authenticator-side communication apparatus making communication with the user-side communication apparatus through the network;

a controller;

a clock for notifying a time at which the second data processing unit received the hash value from the first data processing unit, to the controller; and a printing device, the clock consisting of a cryogenic optical lattice clock, the controller making a time stamp token including information in which the hash value and the time at which the hash value was received are integrated, and transmitting the time stamp token to the first data processing unit through the authenticator-side communication apparatus, and the controller printing the time stamp token onto a sticker by means of the printing device, the sticker being designed to be in the form of ASIC (Application Specific Integrated Circuit), and be aluminum-deposited onto an object such that data stored in the time stamp token is destroyed when the sticker is peeled off the object.

2. The system as set forth in claim 1, wherein the first data processing unit is comprised of a cellular phone.

3. The system as set forth in claim 1, wherein the second data processing unit further includes an encrypter, the controller converting the time stamp token into cryptograph through the encrypter, and printing the cryptograph onto a medium by means of the printing device.

4. The system as set forth in claim 3, wherein the cryptograph is comprised of electronic watermark.

5. The system as set forth in claim 3, wherein the second data processing unit further includes a decoder, the decoder decoding cryptograph having been converted by the encrypter.

6. A data processing unit including:

a communication apparatus for making communication with a data processing unit of a user through a network;

a controller;

a clock informing the controller a time at which data was received from the data processing unit of a user; and a printing device, the communication apparatus receiving a hash value transmitted from the data processing unit of a user, the clock consisting of a cryogenic optical lattice clock the controller making a time stamp token including information in which the hash value and the time at which the hash value was received are integrated, and transmitting the time stamp token to the data processing unit of a user through the communication apparatus, the controller printing the time stamp token onto a sticker by means of the printing device, the sticker being designed to be in the form of ASIC (Application Specific Integrated Circuit) and be aluminum-deposited onto an object such that data stored in the time stamp token is destroyed when the sticker is peeled off the object.

7. The data processing unit as set forth in claim 6 further including an encrypter, the controller converting the time stamp token into cryptograph through the encrypter, and printing the cryptograph onto the sticker by means of the printing device.

8. The data processing unit as set forth in claim 7, wherein the cryptograph is comprised of electronic watermark.

9. The data processing unit as set forth in claim 7 further including a decoder, the decoder decoding cryptograph having been converted by the encrypter.

10. A method of processing data comprised of a hash value received from a data processing unit of a user through a network, including acquiring time data indicative of a time at which the hash value was received from the data processing unit of a user;

making a time stamp token including information in which the hash value and the time data are integrated; and printing the time stamp token onto a sticker, the sticker being designed to be in the form of ASIC (Application Specific Integrated Circuit), and be aluminum-deposited onto an object such that data stored in the time stamp token is destroyed when the sticker is peeled off the object, the time being clocked by means of a cryogenic optical lattice clock.

11. A non-transitory storage medium readable by a computer and storing a program therein for processing data comprised of a hash value received from a data processing unit of a user through a network, wherein the program causes a computer to carry out:

acquiring time data indicative of a time at which the hash value was received from the data processing unit of a user;

making a time stamp token including information in which the hash value and the time data are integrated; and printing the time stamp token onto a sticker, the sticker being designed to be in the form of ASIC (Application Specific Integrated Circuit), and be aluminum-deposited onto an object such that data stored in the time stamp token is destroyed when the sticker is peeled off the object, the time being clocked by means of a cryogenic optical lattice clock.

* * * * *